United States Patent
Yeo et al.

(10) Patent No.: US 9,514,206 B2
(45) Date of Patent: Dec. 6, 2016

(54) SYSTEM AND METHOD FOR PROVIDING CONTENT LIST THROUGH SOCIAL NETWORK SERVICE

(71) Applicant: SAMSUNG ELECTRONICS CO., LTD., Suwon-si (KR)

(72) Inventors: Sin-oug Yeo, Seoul (KR); Tae-ho Wang, Anyang-si (KR); Eun-kyung Yoo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 66 days.

(21) Appl. No.: 14/370,832

(22) PCT Filed: Dec. 31, 2012

(86) PCT No.: PCT/KR2012/011848
§ 371 (c)(1),
(2) Date: Jul. 7, 2014

(87) PCT Pub. No.: WO2013/103231
PCT Pub. Date: Jul. 11, 2013

(65) Prior Publication Data
US 2014/0351336 A1 Nov. 27, 2014

(30) Foreign Application Priority Data
Jan. 4, 2012 (KR) .................. 10-2012-0001151

(51) Int. Cl.
*G06F 15/16* (2006.01)
*G06F 15/177* (2006.01)
(Continued)

(52) U.S. Cl.
CPC ... *G06F 17/30572* (2013.01); *G06F 17/30772* (2013.01); *G06Q 30/02* (2013.01);
(Continued)

(58) Field of Classification Search
CPC .............. G06Q 30/02; G06F 17/30772; G06F 17/30038; H04N 21/4722
(Continued)

(56) References Cited

U.S. PATENT DOCUMENTS

| 6,504,571 B1 * | 1/2003 | Narayanaswami | G06F 17/30265 348/231.99 |
| 2006/0026127 A1 | 2/2006 | Bodlaender | |

(Continued)

FOREIGN PATENT DOCUMENTS

| KR | 10-2006-0056192 A | 5/2006 |
| KR | 10-2008-0087591 A | 10/2008 |

(Continued)

OTHER PUBLICATIONS

English Language Translation of Written Opinion dated Mar. 28, 2013 issued by the International Searching Authority in counterpart PCT/KR2012/011848 (PCT/ISA/237).

(Continued)

*Primary Examiner* — Hieu Hoang
(74) *Attorney, Agent, or Firm* — Sughrue Mion, PLLC

(57) ABSTRACT

Provided are a system and method for providing a content list through a social network service (SNS). A server for providing a content list to a device using an SNS, the server includes: a content receiver that receives content from a first device; a content list generator that generates a content list according to categories by using metadata included in the received content; and a content list provider that provides a content list of a category selected by a second device to the second device.

22 Claims, 8 Drawing Sheets

| CONTENT | DEVICE | USER | GENDER | AGE | LOCATION | DATE | TIME | TYPE | FORMAT |
|---|---|---|---|---|---|---|---|---|---|
| a | A | AA | MALE | 37 | GANGNAM STATION | 2011.12.24 | 12:00 | PHOTO | JPG |
| b | A | AA | MALE | 37 | SEOUL NATIONAL UNIV. OF EDUCATION STATION | 2011.12.25 | 14:00 | VIDEO | MPG |
| c | B | BB | FEMALE | 32 | GANGNAM STATION | 2011.11.22 | 18:00 | TEXT | TXT |
| d | C | BB | FEMALE | 32 | SEOCHO STATION | 2011.12.28 | 11:00 | VIDEO | AVI |
| ... | ... | ... | ... | ... | ... | ... | ... | ... | ... |

(51) Int. Cl.
    *G06F 17/30*     (2006.01)
    *G06Q 30/02*     (2012.01)
    *H04N 21/4722*     (2011.01)
    *H04N 21/4788*     (2011.01)
    *G06Q 50/00*     (2012.01)
    *H04N 21/24*     (2011.01)
    *H04N 21/25*     (2011.01)

(52) U.S. Cl.
    CPC ......... *G06Q 50/01* (2013.01); *H04N 21/2408* (2013.01); *H04N 21/252* (2013.01); *H04N 21/4722* (2013.01); *H04N 21/4788* (2013.01)

(58) Field of Classification Search
    USPC .......................................... 709/202, 222, 229
    See application file for complete search history.

(56) References Cited

U.S. PATENT DOCUMENTS

| | | |
|---|---|---|
| 2006/0112074 A1 | 5/2006 | Han |
| 2008/0243802 A1 | 10/2008 | Han |
| 2009/0006211 A1* | 1/2009 | Perry ..................... G06Q 30/02 705/14.66 |
| 2009/0288150 A1* | 11/2009 | Toomim .............. G06F 21/6218 726/5 |
| 2010/0087209 A1* | 4/2010 | Holm ................. G01C 21/3629 455/457 |
| 2010/0145948 A1 | 6/2010 | Yang et al. |
| 2011/0093415 A1 | 4/2011 | Rhee et al. |
| 2013/0041876 A1* | 2/2013 | Dow ....................... G06Q 50/01 707/706 |
| 2013/0055088 A1* | 2/2013 | Liao ........................ G06F 3/048 715/730 |
| 2013/0080524 A1* | 3/2013 | Rubinstein ......... G06Q 30/0282 709/204 |

FOREIGN PATENT DOCUMENTS

| | | |
|---|---|---|
| KR | 10-2009-0072575 A | 7/2009 |
| KR | 10-2010-0010075 A | 2/2010 |
| KR | 10-2010-0066606 A | 6/2010 |
| KR | 10-2011-0039120 A | 4/2011 |
| KR | 10-2011-0041342 A | 4/2011 |

OTHER PUBLICATIONS

International Search Report dated Mar. 28, 2013 issued by the International Searching Authority in counterpart Application No. PCT/KR2012/011848 (PCT/ISA/210).

* cited by examiner

FIG. 4

| CONTENT /40 | DEVICE /41 | USER /42 | GENDER /43 | AGE /44 | LOCATION /45 | DATE /46 | TIME /47 | TYPE /48 | FORMAT /49 |
|---|---|---|---|---|---|---|---|---|---|
| a | A | AA | MALE | 37 | GANGNAM STATION | 2011.12.24 | 12:00 | PHOTO | JPG |
| b | A | AA | MALE | 37 | SEOUL NATIONAL UNIV. OF EDUCATION STATION | 2011.12.25 | 14:00 | VIDEO | MPG |
| c | B | BB | FEMALE | 32 | GANGNAM STATION | 2011.11.22 | 18:00 | TEXT | TXT |
| d | C | BB | FEMALE | 32 | SEOCHO STATION | 2011.12.28 | 11:00 | VIDEO | AVI |
| ... | ... | ... | ... | ... | ... | ... | ... | ... | ... |

| DEVICE (50) | USER (52) | PREFERRED CATEGORY (54) |
|---|---|---|
| A | AA | UPLOADED REGION |
| B | BB | UPLOADED TIME |
| B | BB | CONTENT TYPE |
| ... | ... | ... |

SYSTEM AND METHOD FOR PROVIDING CONTENT LIST THROUGH SOCIAL NETWORK SERVICE

TECHNICAL FIELD

The present invention relates to a system and method for providing a content list through a social network service, and more particularly, to a system and method for providing a content list, which align and provide a list of contents in a manner suitable to a user in a social network service.

BACKGROUND ART

According to recent development of multimedia technologies and communication technologies, users using a social network service (SNS) share many contents with other users through various devices. Also, in the SNS, contents having various attributes are shared between the users. Since the users want to store many contents for a long period of time and continuously share the contents with other users in the SNS, the contents to be shared need to be effectively classified and managed. Also, for the users to effectively check shared contents in the SNS, the shared contents need to be aligned and provided in formats preferred by the users.

BRIEF SUMMARY

One or more embodiments of the present invention provide a system and method for providing a content list through a social network service (SNS), which are capable of effectively providing content lists aligned according to categories to a device using the SNS.

One or more embodiments of the present invention also provide a system and method for providing a content list through an SNS, which are capable of recommending a category to a device using the SNS based on a content upload history of the device.

BRIEF DESCRIPTION OF THE DRAWINGS

FIG. 4 illustrates an example of an upload history information table according to an embodiment of the present invention.

DETAILED DESCRIPTION OF EXEMPLARY EMBODIMENTS

Figure 1:
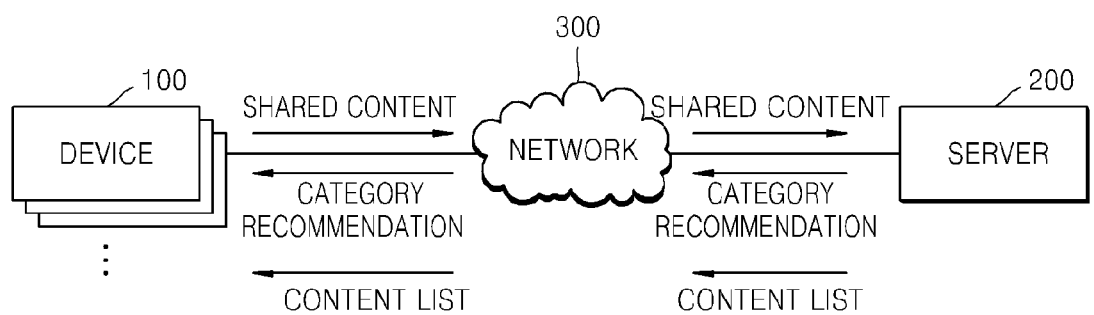
FIG. 1 is an overall conceptual diagram of a system for providing a content list, according to an embodiment of the present invention.

According to an aspect of the present invention, there is provided a server for providing a content list to a device using a social network service (SNS), the server including: a content receiver that receives content from a first device; a content list generator that generates a content list according to categories by using metadata included in the received content; and a content list provider that provides a content list of a category selected by a second device to the second device.

The server may further include a history information generator that generates content upload history information of the first and second devices, wherein the content list generator may generate a content list with respect to the second device based on the generated content upload history information.

The content list generator may determine content to be included in the content list with respect to the second device based on the generated content upload history information.

The server may further include a category recommender that recommends a category of a content list to the second device based on the generated content upload history information.

The category recommender may recommend, to the second device, a preferred category of another device having a similar content upload history as the second device by at least a pre-set numerical value.

The content list provider may provide, to the second device, a content list of a category selected by the second device from the recommended category.

The content upload history information may include information about at least one of a type of uploaded content, a generated location of content, a generated date of content, a generated time of content, an uploaded location of content, an uploaded date of content, and an uploaded time of content.

According to another aspect of the present invention, there is provided a device for receiving a content list from a server through a social network service (SNS), the device including: a content provider that uploads content to a server; a category selector that selects a category of a content list, and provides the selected category to the server; and a content list receiver that receives a content list of the provided category from the server, wherein the content list of the provided category is classified by using metadata of content uploaded from another device using the SNS.

The content list may be generated by the server based on content upload history information of the device and the other device.

Content included in the content list may be selected, by the server, based on the content upload history information.

The category selector may select at least one category from among categories recommended by the server, based on the content upload history information.

The recommended categories may include a preferred category of another device having a similar content upload history as the device by at least a pre-set numerical value.

The content upload history information may include information about at least one of a type of uploaded content, a generated location of content, a generated date of content, a generated time of content, an uploaded location of content, an uploaded date of content, and an uploaded time of content.

According to another aspect of the present invention, there is provided a method for providing, by a server, a content list to a device using a social network service (SNS), the method including: receiving content from a first device; generating a content list according to categories by using metadata included in the received content; and providing a content list of a category selected by a second device, to the second device.

The method may further include generating content upload history information of the first and second devices, wherein the generating of the content list may include generating a content list with respect to the second device based on the generated content upload history information.

According to another aspect of the present invention, there is provided a method of receiving, by a device, a content list from a server through a social network service (SNS), the method including: uploading content to a server; selecting a category of a content list and providing the selected category to the server; and receiving a content list of the provided category from the server, wherein the content list of the provided category is classified by using metadata of content uploaded from another device using the SNS.

The content list may be generated by the server based on content upload history information of the device and the other device.

According to another aspect of the present invention, there is provided a computer-readable recording medium having recorded thereon a program for executing the above method.

Hereinafter, embodiments the present invention will be described more fully with reference to the accompanying drawings to be easily executed by one of ordinary skill in the art. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In drawings, elements irrelevant to description are not shown for clear description, and like elements denote like reference numerals throughout the specification.

In the specification, when a region is "connected" to another region, the regions may not only be "directly connected", but may also be "electrically connected" via another device therebetween. Also, when a region "includes" an element, the region may further include another element instead of excluding the other element, otherwise differently stated.

Also, in the present specification, content upload history information is information about uploaded content, and may include, for example, information about a device that uploaded content, a user of the device, a type and format of the content, a location, date, and time where and when the content is uploaded.

Also, in the present specification, a category is a reference value for aligning content, and may include, for example, at least one of a type of content, a file format of the content, an uploaded location, an uploaded time, and a user.

In a system for providing a content list, according to an embodiment of the present invention, a plurality of devices using a social network service (SNS) upload content to a server, and the server may generate a list of the uploaded contents according to categories and provide the generated list to at least one of the plurality of devices using the SNS.

Hereinafter, the present invention will be described in detail with reference to accompanying drawings.

FIG. 1 is an overall conceptual diagram of a system for providing a content list, according to an embodiment of the present invention.

As shown in FIG. 1, the system for providing a content list, according to an embodiment of the present invention, includes a device 100, a server 200, and a network 300.

The device 100 may share content with another device through an SNS, receive a list of contents to be shared from the server 200, and select content to be shared based on the received content list. Here, the device 100 may be any type of terminal capable of using an SNS through the network 300, for example, may be a mobile phone, a smart phone, a personal digital assistants (PDA), a smart TV, a tablet PC, a PC, or a laptop.

The server 200 may store and manage content shared with the device 100. The server 200 may receive content from the device 100 using the SNS, and may generate content upload history information of the device 100. Also, the server 200 may determine content to be included in a content list by using the generated content upload history information. Also, the server 200 may generate a content list including the determined content according to a predetermined category.

Also, the server 200 may recommend a category of a content list to the device 100, and provide a content list of a category selected by the device 100 to the device 100. In this case, the server 200 may determine a category to be recommended to the device 100 based on the content upload history information.

The network 300 may be realized as a wired network, such as a local area network (LAN), a wide area network (WAN), or a value added network (VAN), or as a wireless network, such as a mobile radio communication network or a satellite communication network. Also, each network composition subject of FIG. 1 is a data communication network in a comprehensive meaning, which enables a smooth communication, and may be a wired Internet, a wireless Internet, or a mobile wireless communication network.

The server 200 according to an embodiment of the present invention will now be described with reference to FIG. 2.

Figure 2:
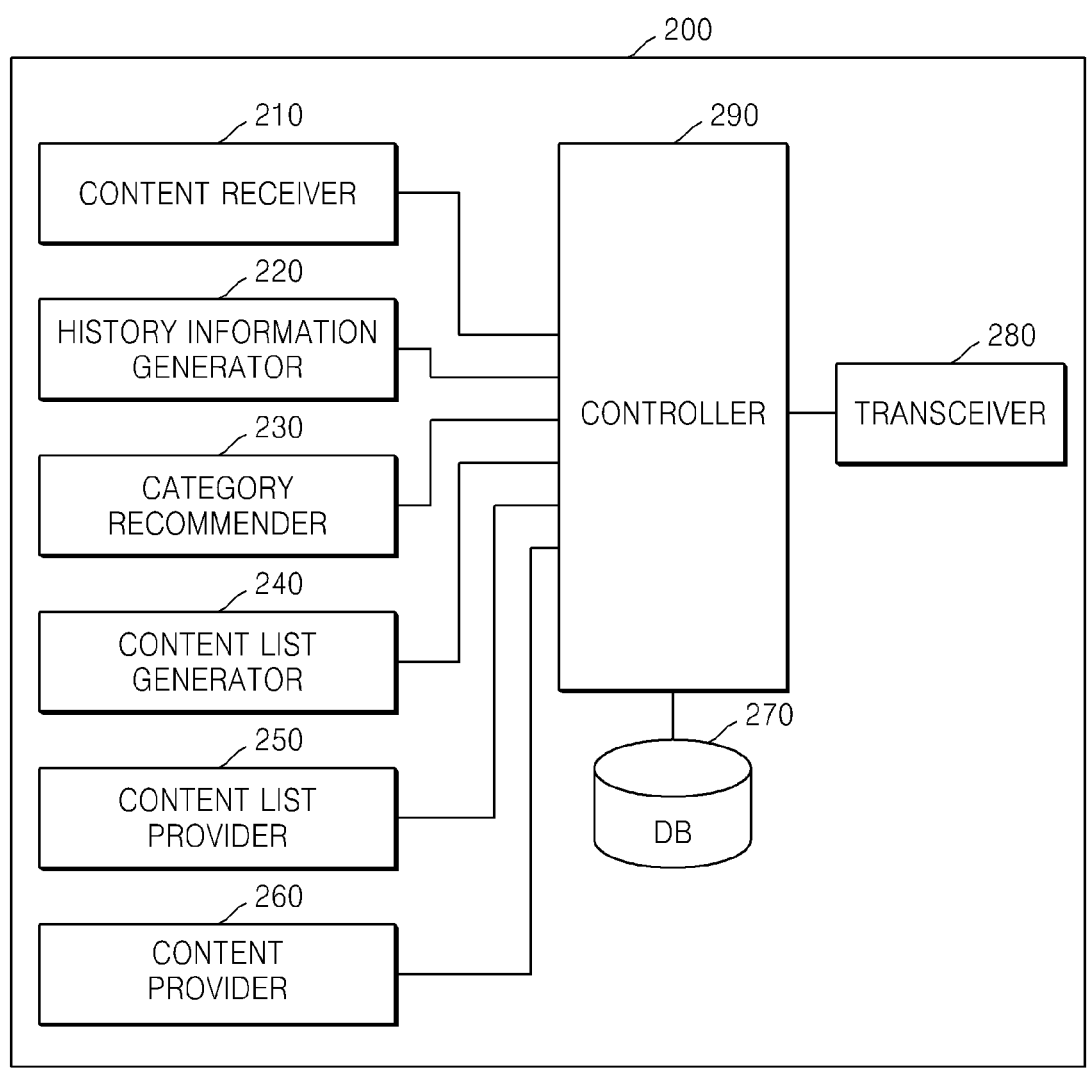
FIG. 2 is a detailed block diagram of a server according to an embodiment of the present invention.

FIG. 2 is a detailed block diagram of the server 200 according to an embodiment of the present invention.

As shown in FIG. 2, the server 200 according to an embodiment of the present invention includes a content receiver 210, a history information generator 220, a category recommender 230, a content list generator 240, a content list provider 250, a content provider 260, a database (DB) 270, a transceiver 280, and a controller 290.

The content receiver 210 receives content from the device 100. The content receiver 210 may receive content to be shared with another device from the device 100 through an SNS. The content received from the device 100 may include metadata about the content, wherein the metadata may include information about, for example, a generated time, capacity, resolution, and running time of the content.

Also, the content receiver 210 may receive device information and user information from the device 100, and may include the received device information and user information to the metadata of the content. Also, the content receiver 210 may include information about a date and time the content is received to the metadata.

The history information generator 220 generates content upload history information of the device 100. The history information generator 220 may collect information related to reception of the content from the device 100, and generate the content upload history information by using the collected information. The history information generator 220 may collect the information related to the reception of the content from the metadata of the content received from the device 100, but is not limited thereto.

Here, the content upload history information is information about uploaded content, and may include, for example, information about a device that uploaded content, a user of the device, a type and format of the content, an uploaded location, date, and time of the content. The content upload history information generated by the history information generator 220 will be described in detail later with reference to FIG. 4.

The category recommender 230 recommends a category of a content list to the device 100. A category is a reference value for aligning content, and may include at least one of, for example, a type of content, a file format of the content, an uploaded location, an uploaded time, and a user.

Also, the category recommender 230 may determine a category to be recommended to the device 100 based on the content upload history information. The category recommender 230 may classify categories based on a type of information included in the content upload history information, and may determine a recommended category from the classified categories. The category recommender 230 may recommend a category including at least a pre-set number of lower categories including at least a pre-set number of contents, as a recommended category. For example, when an 'uploaded region' category includes 'Gangnam Station', 'Seoul National Univ. of Education Station', 'Seocho Station' and 'Daechi Station' as lower categories, and the lower categories including at least 5 contents are 'Gangnam Station', 'Seoul National Univ. of Education Station', and 'Seocho Station' and thus at least 3, the category recommender 230 may determine the 'uploaded region' category as a recommended category.

Also, the category recommender 230 may recommend a preferred category of another device having a similar content upload history as the device 100 by at least a pre-set numerical value to the device 100. The category recommender 230, for example, may determine whether content upload histories of devices are similar by comparing at least one of types of contents, file formats of the contents, uploaded locations, uploaded dates, uploaded times, types of the devices, genders of users, and ages of the users. Also, the category recommender 230 may determine whether the content upload histories are similar based on various standards and algorithms. The preferred category of the other device may be, for example, a category that is selected by the other device at least the pre-set number of times, but is not limited thereto. A preferred category according to devices will be described in detail later with reference to FIG. 5.

Also, the category recommender 230 may calculate a number of times a category is selected by the device 100 according to categories, and recommend a category that is frequently selected by the device 100 to the device 100.

The content list generator 240 generates a content list according to categories. The content list generator 240 may generate a content list aligned according to a category selected by the device 100. In this case, the content list generator 240 may receive a value of the selected category from the device 100, and generate the content list based on the received value. For example, when a 'user' is selected from a recommended category by the device 100, the content list generator 240 may generate a content list aligned according to users. Also, a number of times a category is selected may be calculated by the category recommender 230.

Also, the content list generator 240 may generate the content list according to categories by using metadata of content. The content list generator 240 may align contents according to categories based on metadata of the contents received from the device 100, and generate the content list for each category.

Also, the content list generator 240 may determine content to be included in the content list to be provided to the device 100 based on the content upload history information. The content list generator 240 may check content preferred by the user of the device 100 based on the content upload history information, and include the checked content to the content list. For example, when the content list generator 240 generates a content list about 'Gangnam Station', the content list generator 240 may check a type and file format of content uploaded near the Gangnam Station at least a pre-set number of times, and determine content having a type and file format similar to the checked type and file format as the preferred content of the user. Also, the content list generator 240 may include the preferred content to the content list about 'Gangnam Station'.

Also, the content list generator 240 may determine content to be included in the content list to be provided to the device 100 by referring to preferred content of a friend of the user of the device 100 in the SNS. For example, the content list generator 240 may include preferred content overlapping that of the friend from among preferred contents of the user of the device 100 to the content list.

Also, the content list generator 240 may determine content to be included in the content list based on user information about the user of the device 100. The user information may include, for example, information about an age, a gender, and a residence of the user. The content list generator 240 may determine content to be included in the content list to be provided to the device 100 by referring to referred content of another user who has similar user information.

The content list provider 250 provides the content list to the device 100. The content list provider 250 may provide to the device 100 a content list of a category selected by the device 100 from among categories recommended to the device.

The content provider 260 provides content to the device 100. The content provider 260 may provide to the device 100 content selected by the device 100 from the content list provided to the device 100. The provided content, for example, may be displayed on a chat window of the SNS.

The DB 270 stores various types of information required to provide the content list aligned according to categories to the device 100. For example, the DB 270 may store the content upload history information and preferred category information, but is not limited thereto.

The transceiver 280 transmits and receives the various types of information required to provide the content list aligned according to categories to the device 100 to and from devices using the SNS.

The controller 290 controls overall operations of the server 200, and controls the content receiver 210, the history information generator 220, the category recommender 230, the content list generator 240, the content list provider 250, the content provider 260, the DB 270, and the transceiver 280 such that the content list aligned according to categories is provided to the device 100.

The device 100 according to an embodiment of the present invention will now be described with reference to FIG. 3.

Figure 3:
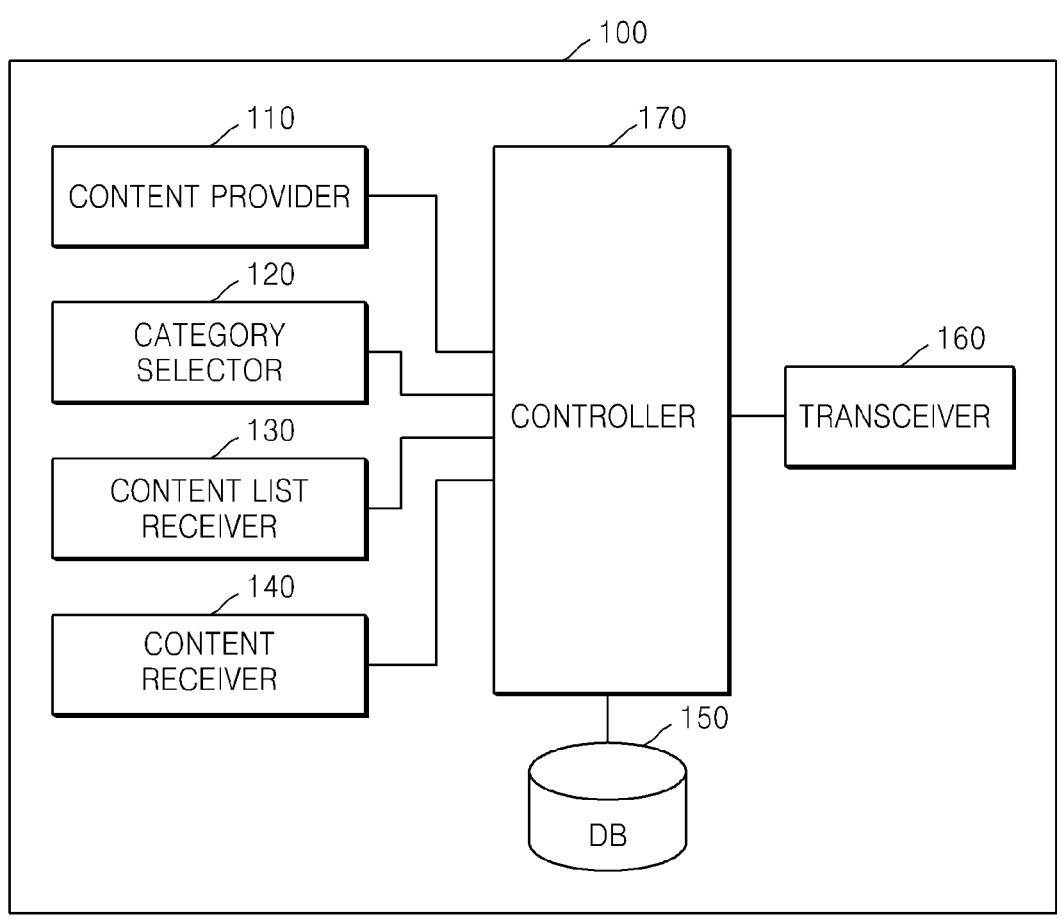
FIG. 3 is a detailed block diagram of a device according to an embodiment of the present invention.

FIG. 3 is a detailed block diagram of the device 100 according to an embodiment of the present invention.

As shown in FIG. 3, the device 100 according to an embodiment of the present invention includes a content provider 110, a category selector 120, a content list receiver 130, a content receiver 140, a DB 150, a transceiver 160, and a controller 170.

The content provider 110 provides content to the server 200. The content provider 110 may provide content to be shared with another device using an SNS to the server 200. Content may include metadata about the content, wherein the metadata may include information about, for example, a generated time, capacity, resolution, and running time of the content.

Also, the content provider 110 may provide device information and user information to the server 200. The device information and the user information may be provided to the server 200 by being included in metadata of content, but are not limited thereto.

The category selector 120 selects a category of a content list. The category selector 120 may receive a recommended category from the server 200, and select at least one category from the recommended category. An example of displaying, by the device 100, a recommended category will be described in detail later with reference to FIG. 7.

The content list receiver 130 receives the content list from the server 200. The content list receiver 130 may receive the content list of the category selected by the category selector 120.

The content receiver 140 receives content from the server 200. The content receiver 140 may receive content selected from the content list from the server 200.

The DB 150 stores various types of information required, by the device 100, to receive a content list of a predetermined category from the server 200.

The transceiver 160 transmits and receives the various types of information required, by the device 100, to receive a content list of a predetermined category from the server 200.

The controller 170 controls overall operations of the device 100, and controls the content provider 110, the category selector 120, the content list receiver 130, the content receiver 140, the DB 150, and the transceiver 160 such that the device 100 receives the content list of the predetermined category from the server 200.

Upload history information according to an embodiment of the present invention will now be described in detail with reference to FIG. 4.

FIG. 4 illustrates an example of an upload history information table according to an embodiment of the present invention.

As shown in FIG. 4, the upload history information table according to an embodiment of the present invention includes a content field 40, a device field 41, a user field 42, a gender field 43, an age field 44, a location field 45, a date field 46, a time field 47, a type filed 48, and a format field 49.

A name of content received from the device 100 may be recorded in the content field 40, and an identification (ID) value of the device 100 that provided the content may be recorded in the device field 41. Also, an ID of a user of the device 100 may be recorded in the user field 42, a gender of the user may be recorded in the gender field 43, and an age of the user may be recorded in the age field 44. Also, a location of a place where the content is provided may be recorded in the location field 45, a date when the content is provided may be recorded in the date field 46, and a time when the content is provided may be recorded in the time field 47. Also, a type value of the content may be recorded in the type field 48, and a file format of the content may be recorded in the format field 49.

The server 200 may align shared contents received from devices using an SNS according to categories and generate a content list of each category by using such an upload history information table. Also, the server 200 may determine a preferred category of a user by using the upload history information table, and determine content to be included in a content list.

Preferred category information according to an embodiment of the present invention will now be described with reference to FIG. 5.

Figures 5, 6:
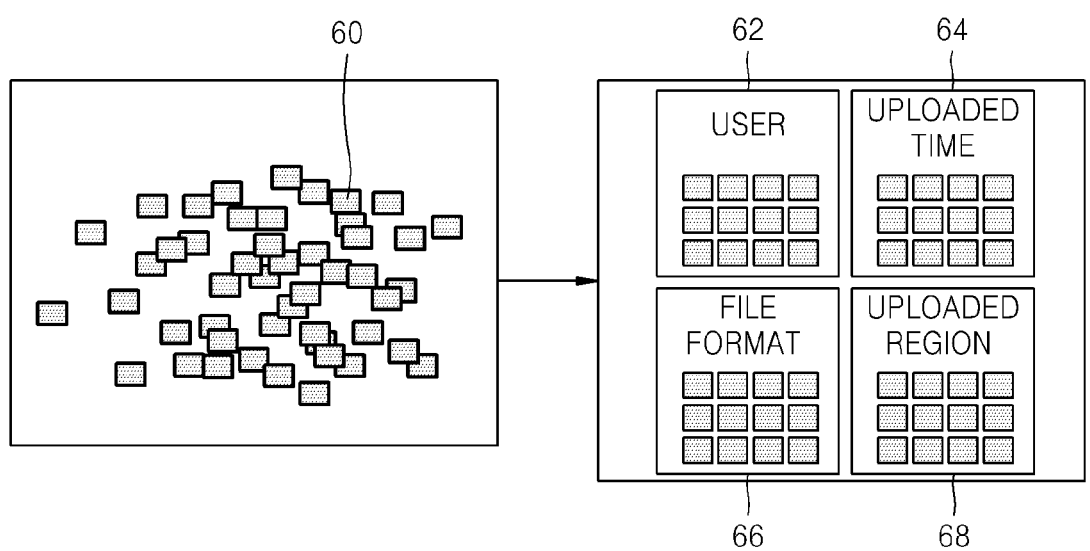
FIG. 5 illustrates an example of a preferred category information table according to an embodiment of the present invention.
FIG. 6 illustrates an example of generating a content list according to categories by using metadata of contents stored in a database (DB), according to an embodiment of the present invention.

FIG. 5 illustrates an example of a preferred category information table according to an embodiment of the present invention.

As shown in FIG. 5, the preferred category information table according to an embodiment of the present invention includes a device field 50, a user field 52, and a preferred category field 54.

An ID value of a device is recorded in the device field 50 and a user ID may be recorded in the user field 52. Also, information about a preferred category that is preferred by a user of a device may be recorded in the preferred category field 54.

Examples of a preferred category may include an uploaded region, an uploaded time, and a content type, but are not limited thereto. Also, a preferred category may be a category that is selected by a device at least a pre-set number of times.

An example of generating a content list according to categories, according to an embodiment of the present invention, will now be described with reference to FIG. 6.

FIG. 6 illustrates an example of generating a content list according to categories by using metadata of contents stored in the DB 270, according to an embodiment of the present invention.

As shown in FIG. 6, the DB 270 may store various contents 60 uploaded from devices, and the contents 60 may each include metadata. Also, the server 200 may determine a category based on various types of additional information included in the metadata, and generate content lists 62, 64, 66, and 68 by aligning the contents 60 according to each category. For example, the categories may include 'User', 'Uploaded Time', 'File Format', and 'Uploaded Region', and the server 200 may generate contents lists with respect to 'User', 'Uploaded Time', 'File Format', and 'Uploaded Region'.

An example of displaying, by the device 100, a category recommendation list while an SNS is provided, according to an embodiment of the present invention, will now be described with reference to FIG. 7.

Figure 7:
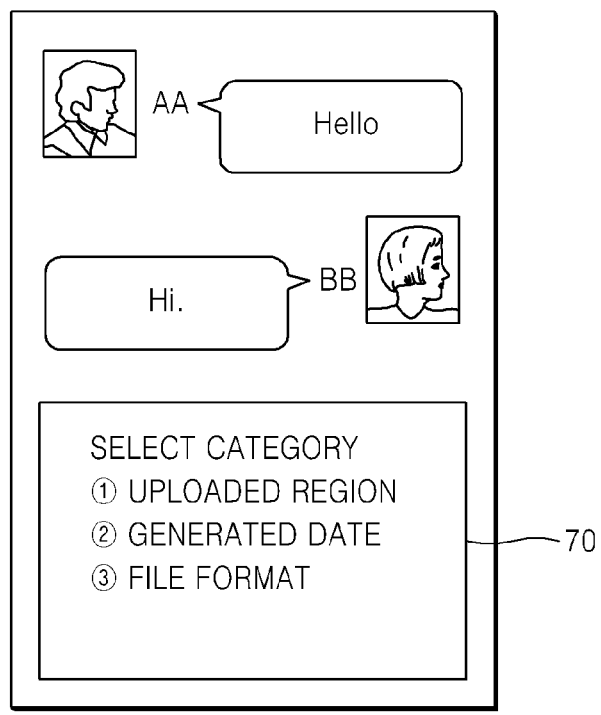
FIG. 7 illustrates an example of displaying, by a device, a category recommendation list while a social network service (SNS) is provided, according to an embodiment of the present invention.

FIG. 7 illustrates an example of displaying, by the device 100, a category recommendation list while an SNS is provided, according to an embodiment of the present invention.

As shown in FIG. 7, when a user AA communicating with a user BB through an SNS wants to share content with the user BB, a category recommendation list 70 may be overlapped and displayed on a chat window displayed on a device of the user AA. A recommended category may be determined by the server 200 based on content upload history information, and for example, a category including at least a pre-set number of lower categories including at least a pre-set number of contents may be determined as the recommended category. Also, a category that is frequently selected by the device 100 may be determined as the recommended category, but the recommended category is not limited thereto.

Examples of displaying a content list according to categories on the device 100, according to embodiments of the present invention, will now be described with reference to FIGS. 8 and 9.

Figure 8:
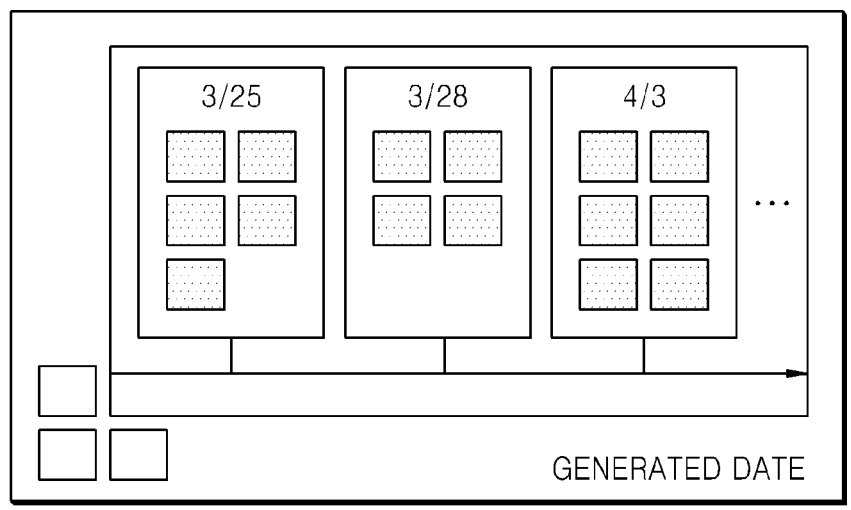
FIG. 8 illustrates an example of displaying, on a device, content lists aligned according to uploaded dates, according to an embodiment of the present invention.

FIG. 8 illustrates an example of displaying, on the device 100, content lists aligned according to uploaded dates, according to an embodiment of the present invention.

As shown in FIG. 8, an 'uploaded date' category may include '3/25', '3/28', and '4/3' as lower categories, and contents may be classified and displayed according to '3/25', '3/28', and '4/3' that are the lower categories.

Figure 9:
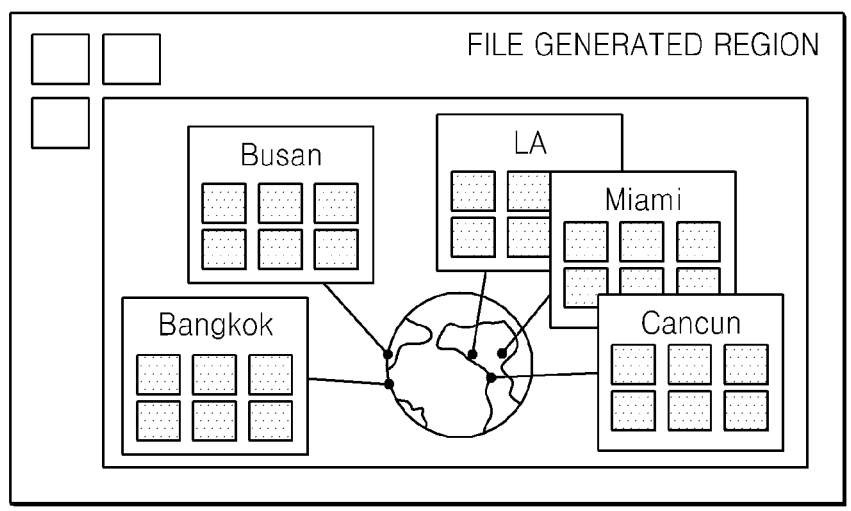
FIG. 9 illustrates an example of displaying, on a device, content lists aligned according to uploaded regions, according to an embodiment of the present invention.

FIG. 9 illustrates an example of displaying, on the device 100, content lists aligned according to uploaded regions, according to an embodiment of the present invention.

As shown in FIG. 9, an 'uploaded region' category may include 'Busan', 'Bangkok', 'LA', 'Miami', and 'Cancun' as lower categories, and contents may be classified and displayed according to 'Busan', 'Bangkok', 'LA', 'Miami', and 'Cancun' that are the lower categories. Also, a map image 90 may be displayed on the device 100, and a content list of each lower category may be connected to a certain region on the map image 90.

A method of providing a content list, according to an embodiment of the present invention will now be described with reference to FIG. 10.

Figure 10:
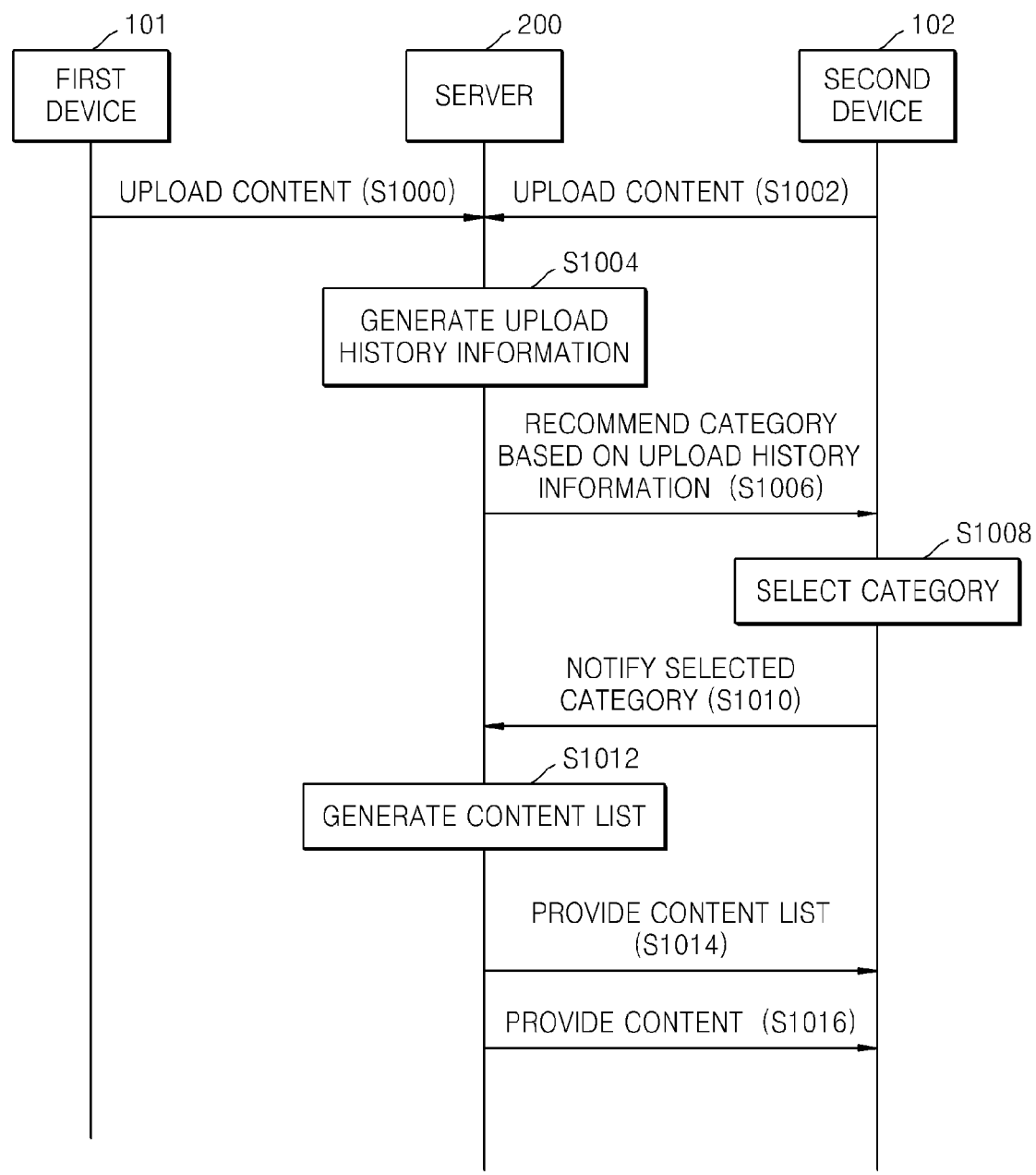
FIG. 10 is a detailed flowchart of a method for providing a content list, according to an embodiment of the present invention.

FIG. 10 is a detailed flowchart of a method for providing a content list, according to an embodiment of the present invention.

In operation S1000, a first device 101 uploads shared content to the server 200, and in operation S1002, a second device 102 uploads shared content to the server 200. The shared content may include metadata about content, and the metadata may include, for example, information about a generated time, capacity, resolution, and running time of the content.

In operations S1000 and S1002, the first and second devices 101 and 102 may provide device information and user information to the server 200. Also, the server 200 may include device information, user information, and information about a date and time when content is uploaded, to the metadata.

In operation S1004, the server 200 generates upload history information of content. In operation S1004, the server 200 may collect information about content from the metadata included in the shared content. Content upload history information may include, for example, information about a device that uploaded content, a user of the device, a type and format of the content, a location, date, and time where and when the content is uploaded.

In operation S1006, the server 200 recommends a category to the second device 102 based on the content upload history information. A category is a reference value for aligning contents, and for example, may include at least one of a type of content, a file format of content, an uploaded location, an uploaded time, and a user.

Also, in operation S1006, the server 200 may determine a category to be recommended to the second device 102 based on the content upload history information. The server 200 may classify categories based on types of information included in the content upload history information, and determine a recommended category from the classified categories. Also, the server 200 may determine a category including at least a pre-set number of lower categories including at least a pre-set number of contents as a recommended category. For example, when an 'uploaded region' category includes 'Gangnam Station', 'Seoul National Univ. of Education Station', 'Seocho Station' and 'Daechi Station' as lower categories, and the lower categories including at least 5 contents are 'Gangnam Station', 'Seoul National Univ. of Education Station', and 'Seocho Station' and thus at least 3, the server 200 may determine the 'uploaded region' category as a recommended category.

Also, in operation S1006, the server 200 may recommend, to the second device 102, a preferred category of another device having a similar content upload history as the second device 102 by at least a pre-set numerical value. For example, the server 200 may determine whether content upload histories of devices are similar by comparing at least one of types of contents, file formats of contents, uploaded locations, uploaded dates, uploaded times, types of the devices, genders of users, and ages of the users. Also, the server 200 may determine whether content upload histories are similar based on various standards and algorithms. A preferred category of another device may be a category that is selected by the other device at least a pre-set number of times, but is not limited thereto.

Also, in operation S1006, the server 200 may accumulate and calculate a number of times a category is selected by the second device 102 according to categories, and recommend a category that is frequently selected by the second device 102 to the second device 102.

In operation S1008, the second device 102 selects a category of a content list. The second device 102 may select at least one category from among the recommended categories received from the server 200. Also, in operation S1010, the second device 102 notifies the selected category to the server 200.

In operation S1012, the server 200 generates a content list. In operation S1012, the server 200 may generate a content list aligned according to the categories selected by the second device 102. For example, when the second device 102 selects 'User' from among the recommended categories, the server 200 may generate a content list aligned according to users. Also, a number of times a category is selected may be calculated by the server 200.

Also, in operation S1012, the server 200 may generate a content list according to categories by using metadata of content. The server 200 may align contents according to categories based on metadata of shared content, and generate a content list for each category.

Also, in operation S1012, the server 200 may determine content to be included in a content list to be provided to the second device 102, based on content upload history information. The server 200 may check content preferred by a user of the second device 102 based on content upload history information, and include the checked content to a content list. For example, when the server 200 generates a content list about 'Gangnam Station', the server 200 may check a type and file format of content uploaded from the second device 102 near the Gangnam Station at least a pre-set number of times, and determine content having a type and file format similar to the checked type and file format as preferred content of the user. Also, the server 200 may include the preferred content to the content list about 'Gangnam Station'.

Also, in operation S1012, the server 200 may determine content to be included in the content list to be provided to the second device 102 by referring to preferred content of a friend of the user of the second device 102 in the SNS. For example, the server 200 may include preferred content overlapping that of the friend from among preferred contents of the user of the second device 102 to the content list.

Also, in operation S1012, the server 200 may determine content to be included in the content list based on user information about the user of the second device 102. The user information may include, for example, information about an age, a gender, and a residence of the user. The server 200 may determine content to be included in the content list to be provided to the second device 102 by referring to referred content of another user who has similar user information.

In operation S1014, the server 200 provides the content list to the second device 102. In operation S1014, the server 200 may provide, to the second device 102, the content list of the category selected by the second device 102, form among the categories recommended to the second device 102.

In operation S1016, the server 200 provides content to the second device 102. In operation S1016, the server 200 may provide, to the second device 102, content selected by the second device 102 from the content list provided to the second device 102. Also, the provided content may be displayed, for example, on a chat window of the SNS.

An embodiment of the present invention may also be realized in a form of a computer-readable recording medium, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium.

While the present invention has been particularly shown and described with reference to exemplary embodiments thereof, it will be understood by those of ordinary skill in the art that various changes in form and details may be made therein without departing from the spirit and scope of the present invention as defined by the following claims. Hence, it will be understood that the embodiments described above are not limiting the scope of the invention. For example, each component described in a single type may be executed in a distributed manner, and components described distributed may also be executed in an integrated form.

The scope of the present invention is indicated by the claims which will be described in the following rather than the detailed description of the invention, and it should be understood that the claims and all modifications or modified forms drawn from the concept of the claims are included in the scope of the present invention.

The invention claimed is:

1. A server for providing a content list to a device using a social network service (SNS), the server comprising:
a communication interface that receives content from a first device;
a controller that generates content upload history information of a second device, and recommends at least one category to the second device based on the generated content upload history information, and generates a content list according to the at least category by using metadata included in the received content,
wherein the communication interface provides a content list of a category selected by the second device to the second device, and
wherein the controller determines which categories from among a plurality of categories to recommend based on a type of information included in the content upload history information.

2. The server of claim 1,
wherein the controller generates a content list with respect to the second device based on the generated content upload history information.

3. The server of claim 2, wherein the controller determines content to be included in the content list with respect to the second device based on the generated content upload history information.

4. The server of claim 2, wherein the content upload history information comprises information about at least one of a type of uploaded content, a generated location of content, a generated date of content, a generated time of content, an uploaded location of content, an uploaded date of content, and an uploaded time of content.

5. The server of claim 1, wherein the controller recommends, to the second device, a preferred category of another device having a similar content upload history as the second device by at least a pre-set numerical value.

6. The server of claim 1, wherein the controller provides, to the second device, a content list of a category selected by the second device from the at least one category.

7. The server of claim 1, wherein the controller classifies the plurality of categories based on the type of information included in the content upload history information and determines the plurality of categories to recommend based on the classifying and wherein the determining the plurality of categories by the controller comprises determining a first category based on a pre-set number of contents classified in lower categories from the first category.

8. The server of claim 1, wherein the controller determines whether to recommend a first category from among the plurality of categories based on a predetermined number of contents classified in the first category.

9. The server of claim 1, further comprising providing the determined categories to the second device for a display on the second device and receiving a selection from a user of at least one recommended category from among the provided categories.

10. A device for receiving a content list from a server through a social network service (SNS), the device comprising:
a content provider that uploads content to a server;
a category selector that receives at least one category of a content list, recommended based on content upload history information and that selects a category from among the received at least one category, and provides the selected category to the server; and
a content list receiver that receives a content list of the provided category from the server, wherein the content list of the provided category is classified by using metadata of content uploaded from another device using the SNS, and wherein the category selector determines which categories from among a plurality of categories to select based on a type of information included in the content upload history information.

11. The device of claim 10, wherein the content list is generated by the server based on the content upload history information of the device and the other device.

12. The device of claim 11, wherein content included in the content list is selected, by the server, based on the content upload history information.

13. The device of claim 11, wherein the category selector selects the category from among received plurality of categories recommended by the server, based on the content upload history information.

14. The device of claim 13, wherein the recommended categories comprise a preferred category of another device having a similar content upload history as the device by at least a pre-set numerical value.

15. The device of claim 10, further comprising a display that displays the determined categories overlapped on a chat window of the SNS.

16. The device of claim 10, further comprising a display that displays the determined categories, wherein the category is selected by a user from among the displayed categories.

17. A method for providing, by a server, a content list to a device using a social network service (SNS), the method comprising:

receiving content from a first device;

generating content upload history information of a second device;

recommending at least one category to the second device based on the generated content upload history information;

generating a content list according to the at least one category by using metadata included in the received content; and providing a content list of a category selected by the second device, to the second device, wherein the recommending said at least one category comprises determining which categories from among a plurality of categories to recommend based on a type of information included in the content upload history information.

18. The method of claim 17, wherein the upload history information comprises information related to the uploaded content of the first device and the second device, which is content shared between the devices using the SNS and wherein the at least one category comprises a plurality of categories generated based on at least one of type of the content, file format of the content, and an upload location obtained from the upload history information.

19. A method of receiving, by a device, a content list from a server through a social network service (SNS), the method comprising:

uploading content to a server;

determining at least one category to recommend from among a plurality of categories based on type of information included in content upload history information;

receiving said determined at least one category of a content list;

selecting a category from among the received at least one category and providing the selected category to the server; and receiving a content list of the provided category from the server, wherein the content list of the provided category is classified by using metadata of content uploaded from another device using the SNS.

20. A non-transitory computer-readable recording medium having recorded thereon a program for executing the method of claim 19.

21. A method for providing, by a server, a content list to a device using a social network service (SNS), the method comprising:

receiving content from a first device;

generating content upload history information of a second device;

recommending at least one category to the second device based on the generated content upload history information;

generating a content list according to the at least one category by using metadata included in the received content; and providing a content list of a category selected by the second device, to the second device, wherein the recommending the at least one category comprises:

classifying a plurality of categories based on a type of information included in the content upload history information; and determining the plurality of categories to recommend based on the classifying, and wherein the determining plurality of categories comprises determining a first category based on a pre-set number of contents classified in lower categories from the first category.

22. A method of receiving, by a device, a content list from a server through a social network service (SNS), the method comprising:

uploading content to a server;

receiving at least one category of a content list, recommended based on content upload history information;

displaying the received at least one category of the content list overlapped on a chat window of the SNS;

selecting a category from among the displayed at least one category and providing the selected category to the server; and receiving a content list of the provided category from the server, wherein the content list of the provided category is classified by using metadata of content uploaded from another device using the SNS, and wherein the selecting the category comprises receiving user input for selecting one of the displayed at least one category.

* * * * *